2,744,828

PRODUCTION OF IMPROVED DRIED EGG WHITES

Martell M. Gladstone, Chicago, and Benjamin R. Harris, Glencoe, Ill., assignors, by mesne assignments, to Benjamin R. Harris, Chicago, Ill.

No Drawing. Application January 25, 1952, Serial No. 268,346

9 Claims. (Cl. 99—210)

This invention relates to the treatment of liquid egg whites and is particularly concerned with the preparation of dried egg whites and, more particularly, pan-dried or tunnel-dried fermented egg whites having superior qualities and characteristics.

It is well recognized in the art that when liquid egg whites are dried in their natural condition a product is produced which is objectionable from a number of standpoints including its reconstitution, whipping and keeping properties. The drying and, more especially, prolonged aging as, for example, during storage or the like, cause deep-seated objectionable changes in the properties and characteristics of the natural liquid egg whites. It has, therefore, been standard practice to subject the liquid egg whites, prior to the drying step, to processing which may take the form of fermentation under natural conditions as, for example, in the common practice of producing Chinese egg albumin, or under controlled fermentation conditions as disclosed, for example, in U. S. Patents Nos. 1,818,212 and 1,818,214, or through the use of ripening, enzymatic and yeast treatments. For convenience, all of these treatments, preceding drying, comprising bacterial, yeast, enzymatic and other processing treatments of liquid egg whites in which the content of reducing sugars is eliminated or decreased are referred to herein as fermentation procedures. While such procedures result in products having certain significant advantages with regard to whipping properties and the like, they concomitantly introduce serious objections with respect to the odor of the final product, particularly in dried summer egg whites, and which are manifested especially where the dried egg whites are used in baked goods such as angel food cakes.

In an effort to obviate the disadvantages of heretofore known fermentation procedures, it has been proposed to eliminate the same and resort, instead, to the treatment of natural liquid egg whites with controlled additions of various non-toxic acids such as lactic acid, hydrochloric acid and the like, prior to the drying operation. Despite such suggestions and practices in the art, the most satisfactory dried egg white products, with due regard for a number of objections thereto in relation to procedures for their preparation and, especially, in relation to odor characteristics, have been those wherein a fermentation operation, in one form or other, is utilized.

The present invention is predicated on the discovery that, in a method involving the fermentation of liquid egg whites, if the liquid egg whites are, prior to being dried, subjected to the action of ultraviolet rays, marked improvements result in the final products, particularly in relation to improvements in their odor characteristics, stability against deterioration during storage, and the avoidance of the development of objectionable odors in storage. These important advantages are obtained without sacrifice of such desired properties as whipping, sugar-carrying capacity and functional performance in products such as cakes, meringues, confections and the like.

The subjecting of the liquid egg whites to ultraviolet rays may be carried out in a variety of ways with various types of equipment. Thus, for example, the ultraviolet rays can be projected upon thin layers of the liquid egg whites so as to insure adequate penetration of the liquid egg whites by the ultraviolet rays. In another type of procedure, the liquid egg whites may be subjected to stirring or mixing during their exposure to the ultraviolet rays so as to insure adequate exposure of the liquid egg material to the ultraviolet rays. Care should be exercised, however, to avoid undue foaming of the liquid egg whites. In general, exposure of the liquid egg whites to the ultraviolet rays for a period of several seconds and, in certain cases, for of the order of even one or two seconds is adequate. Exposure over an extended period of time is unnecessary and, in certain cases, may be somewhat detrimental. It is important that the temperature during treatment, the exposure time, and the intensity of irradiation do not rise above the coagulation range. So far as temperature is concerned, it is preferable to operate under such conditions that the temperature of the liquid egg whites while being irradiated is of the order of about 40 to about 110 degrees F. This presents no particular problem since, with existing quartz tube ultraviolet ray generating equipment, the flow rate of the liquid egg whites can be controlled readily so that the liquid egg whites are not subjected to unduly high temperatures.

Since many types of existing equipment are available on the market for the treatment of liquids with ultraviolet rays, it is unnecessary to refer to any particular equipment in connection with which the method of the present invention may be carried out. The equipment utilized is of the type which generates the shorter rays of the ultraviolet spectrum, that is, the rays which pass through quartz. It is also particularly advantageous to carry out the irradiation of the liquid egg whites in the absence or substantial absence of air. To this end, the air in the system may be swept out and kept out of the system by means of an inert gas such as nitrogen, argon or the like. It is desirable to employ equipment having a capacity to treat from a thousand to five thousand gallons of liquid egg whites per hour in order to insure economical operations.

The treatment with the ultraviolet rays can, in the broad aspect of the invention, take place at various stages of the treatment of the liquid egg whites. Thus, for example, the subjection of the liquid egg whites to the ultraviolet rays can be carried out either prior to the fermentation step or subsequent thereto or both prior and subsequent to the fermentation step. In any event, the treatment with the ultraviolet rays is carried out prior to the completion of the drying operation. It is particularly desirable, however, that the irradiation treatment precede the fermentation treatment of the liquid egg whites. Under some conditions, the pan-drying or tunnel-drying operation can be carried out by subjecting unfermented liquid egg whites, and, more particularly, by subjecting the previously treated fermented liquid egg whites, in their drying pans or the like to ultraviolet rays. In other words, ultraviolet ray lamps may be installed in the drying chamber. In general, however, this operation is not necessary, it being advantageous, as pointed out above, to carry out the treatment of the liquid egg whites with the ultraviolet rays prior to effecting the pan- or tunnel-drying of the fermented liquid egg whites.

It will be understood, of course, that the method of the present invention can be utilized in conjunction with any known practices in the art in relation to the preparation of dried, fermented egg whites. Thus, for example, the utilization of particular pH controls, and additions of various agents and the like, are all encompassed by the present invention so long as the treatments involved include the subjection of the liquid egg whites to a fermentation treatment, and particularly where followed, in due course, by a drying operation. It is not uncommon to freeze liquid egg whites and store them in frozen condition for subsequent drying. The present invention encompasses such operations providing that the liquid egg whites, prior to being actually dried, are subjected to a fermentation treatment and an ultraviolet ray treatment as described hereinabove. So far as the fermentation treatment is concerned, no novelty is claimed therein per se but only as a part of a process which includes an ultraviolet ray treatment of the liquid egg whites, and, especially, a process which includes a drying, and particularly a pan- or tunnel-drying or like, operation. An alternative form of drying, wherein the treated liquid egg whites are whipped into a foam and then dried, as shown in U. S. Patent No. 2,200,963 and British Patent No. 314,887, can be utilized. Typical fermentation procedures are referred to, for instance, in U. S. Patents Nos. 1,818,212 and 1,818,214, previously mentioned, as well as in U. S. Patents Nos. 1,996,801; 2,056,082; 2,166,070 and 2,460,986.

What we claim as new and desire to protect by Letters Patent of the United States is:

1. In a method of preparing an improved fermented egg white, the steps which comprise subjecting liquid egg whites to the action of ultraviolet rays and then fermenting said liquid egg whites.

2. In a method of preparing an improved fermented dried egg albumen, the steps which comprise fermenting liquid egg whites and then subjecting them to the action of ultraviolet rays.

3. In a method of preparing an improved fermented dried egg albumen, the steps which comprise subjecting liquid egg whites to the action of ultraviolet rays, fermenting said liquid egg whites, and subsequently pan-drying them.

4. In a method of preparing an improved fermented dried egg albumen, the steps which comprise fermenting liquid egg whites, subjecting them to the action of ultraviolet rays, and subsequently pan-drying them.

5. In a method of preparing an improved fermented dried egg albumen, the step which comprises subjecting fermented liquid egg whites, during pan-drying thereof, to the action of ultraviolet rays.

6. In a method of preparing an improved fermented egg white, the steps which comprise subjecting liquid egg whites to the action of ultraviolet rays in the substantial absence of air, and then fermenting said liquid egg whites.

7. In a method of preparing an improved fermented dried egg albumen, the steps which comprise subjecting liquid egg whites to the action of ultraviolet rays in the substantial absence of air, fermenting said liquid egg whites, and subsequently pan-drying them.

8. In a method of preparing an improved fermented dried egg albumen, the steps which comprise fermenting liquid egg whites, subjecting them to the action of ultraviolet rays in the substantial absence of air, and subsequently pan-drying them.

9. In a method of preparing an improved fermented dried egg albumen, the steps which comprise subjecting liquid egg whites to the action of ultraviolet rays in the substantial absence of air, fermenting said liquid egg whites, again subjecting them to the action of ultraviolet rays in the substantial absence of air, and subsequently pan-drying them.

References Cited in the file of this patent

UNITED STATES PATENTS

| | | |
|---|---|---|
| 1,182,213 | Ryan | May 9, 1916 |
| 1,818,214 | Epstein et al. | Aug. 11, 1931 |
| 1,945,102 | Tranin et al. | Jan. 30, 1934 |
| 2,427,726 | Hopkins et al. | Sept. 23, 1947 |
| 2,465,875 | Hopkins | Mar. 29, 1949 |